United States Patent
Green et al.

(10) Patent No.: US 8,330,106 B2
(45) Date of Patent: Dec. 11, 2012

(54) RADIATION MONITOR

(75) Inventors: Darrell Green, Cleveland (GB); Colin Cunningham, Cleveland (GB)

(73) Assignee: Johnson Matthey PLC, London (GB)

( * ) Notice: Subject to any disclaimer, the term of this patent is extended or adjusted under 35 U.S.C. 154(b) by 159 days.

(21) Appl. No.: 12/065,852

(22) PCT Filed: Sep. 8, 2006

(86) PCT No.: PCT/GB2006/050280
§ 371 (c)(1),
(2), (4) Date: Mar. 5, 2008

(87) PCT Pub. No.: WO2007/029040
PCT Pub. Date: Mar. 15, 2007

(65) Prior Publication Data
US 2009/0114833 A1 May 7, 2009

(30) Foreign Application Priority Data
Sep. 9, 2005 (GB) .................................. 0518415.5

(51) Int. Cl.
*G01J 1/00* (2006.01)

(52) U.S. Cl. .................................................. 250/336.1

(58) Field of Classification Search ............... 250/336.1; 313/93; D10/47
See application file for complete search history.

(56) References Cited

U.S. PATENT DOCUMENTS

| | | | |
|---|---|---|---|
| 4,862,004 A * | 8/1989 | Koike et al. | 250/369 |
| 5,426,305 A | 6/1995 | Siebentritt, Jr. et al. | |
| 5,567,946 A | 10/1996 | Stevens et al. | |
| 7,557,353 B2 * | 7/2009 | Black et al. | 250/370.07 |
| 2004/0119591 A1 * | 6/2004 | Peeters | 340/539.26 |
| 2004/0251422 A1 | 12/2004 | Overhoff | |

FOREIGN PATENT DOCUMENTS

| | | |
|---|---|---|
| DE | 11 00 187 | 2/1961 |
| EP | 0 313 716 A1 | 5/1989 |
| EP | 0 313 716 A1 | 5/1989 |

OTHER PUBLICATIONS

B. J. Mijnheer et al., "Comparison of the fast-neutron sensitivity of a Geiger-Müller counter using different techniques," *Phys. Med. Biol.*, 1982, vol. 27, No. 1, pp. 91-96.
"Gamma-Scout Radiation Detector," Jan. 3, 2003, XP-002413064, retrieved from the internet: URL: http//web.archive.org/web/20051231192818/www.gammascout.com/PDFUserGuide.pdf.

* cited by examiner

*Primary Examiner* — David Porta
*Assistant Examiner* — Carolyn Igyarto
(74) *Attorney, Agent, or Firm* — RatnerPrestia

(57) ABSTRACT

The invention comprises a radiation and contamination monitor for the monitoring of radiation and contamination. The instrument is intrinsically safe and comprises a radiation detector, a power source, a signal processor and a display, said power source, signal processor and display being housed within a sealed instrument housing formed from a non-metallic material which is resistant to static discharge. The detector may be housed in a detachable housing for contamination monitoring.

14 Claims, 4 Drawing Sheets

RADIATION MONITOR

CROSS-REFERENCE TO RELATED APPLICATIONS

This application is the U.S. National Phase application of PCT International Application No. PCT/GB2006/050280, filed Sep. 8, 2006, and claims priority of British Patent Application No. 0518415.5, filed Sep. 9, 2005, the contents of which are incorporated herein by reference.

FIELD OF THE INVENTION

The present invention relates to monitors for radioactivity, in particular to contamination monitors and radiation dose meters.

BACKGROUND OF THE INVENTION

Contamination monitors and radiation dose meters are common for use in industries in which the presence of and exposure to low levels of radioactive materials is a hazard. For example, in drilling operations, the formation of radioactive scales on the platform may occur and it is usual for the platform to be checked periodically to detect such scales and other materials which may pose a hazard to workers. These environments may also present other hazards such as the risk of fire or explosion due to the possible presence of combustible gas or liquids. In such environments, such as those encountered in oil and gas exploration, it is necessary to use intrinsically safe equipment in order to eliminate the risk of igniting combustible gases through sparking.

SUMMARY OF THE INVENTION

According to the invention we provide an intrinsically safe instrument for the measurement of radiation comprising a radiation detector, a power source, a signal processor and a display, said power source, signal processor and display being housed within a sealed instrument housing formed from a non-metallic material which is resistant to static discharge.

The instrument is sized to be hand-held and preferably comprises an integral handle portion, optionally provided with a texture or pattern to assist holding or gripping the instrument.

The radiation detector preferably comprises a Geiger Muller tube. When the instrument is intended for use as a dose rate monitor, an energy-compensated Geiger Muller tube is used. In a preferred embodiment of a dose-rate monitor of the invention a single halogen, energy compensated Geiger Muller tube is used which is suitable for the detection of gamma and X-radiation having energies in the range from 40 keV to 1.4 MeV, more preferably from 50 to 1.25 keV.

When the instrument is intended for use as a contamination monitor, i.e. for the measurement of radiation emitted from contaminated surfaces, it is preferred to use a Geiger Muller tube having a thin window and a relatively large surface area. This detector is preferably selected to be suitable for the detection of low energy radioactive particles such as β- or α-particles. In a preferred embodiment of a contamination monitor of the invention a single halogen Geiger Muller tube is used.

BRIEF DESCRIPTION OF THE DRAWINGS

The instrument according to the invention will be further described with reference to the accompanying drawings which are.

DETAILED DESCRIPTION OF THE INVENTION

Figure 1:
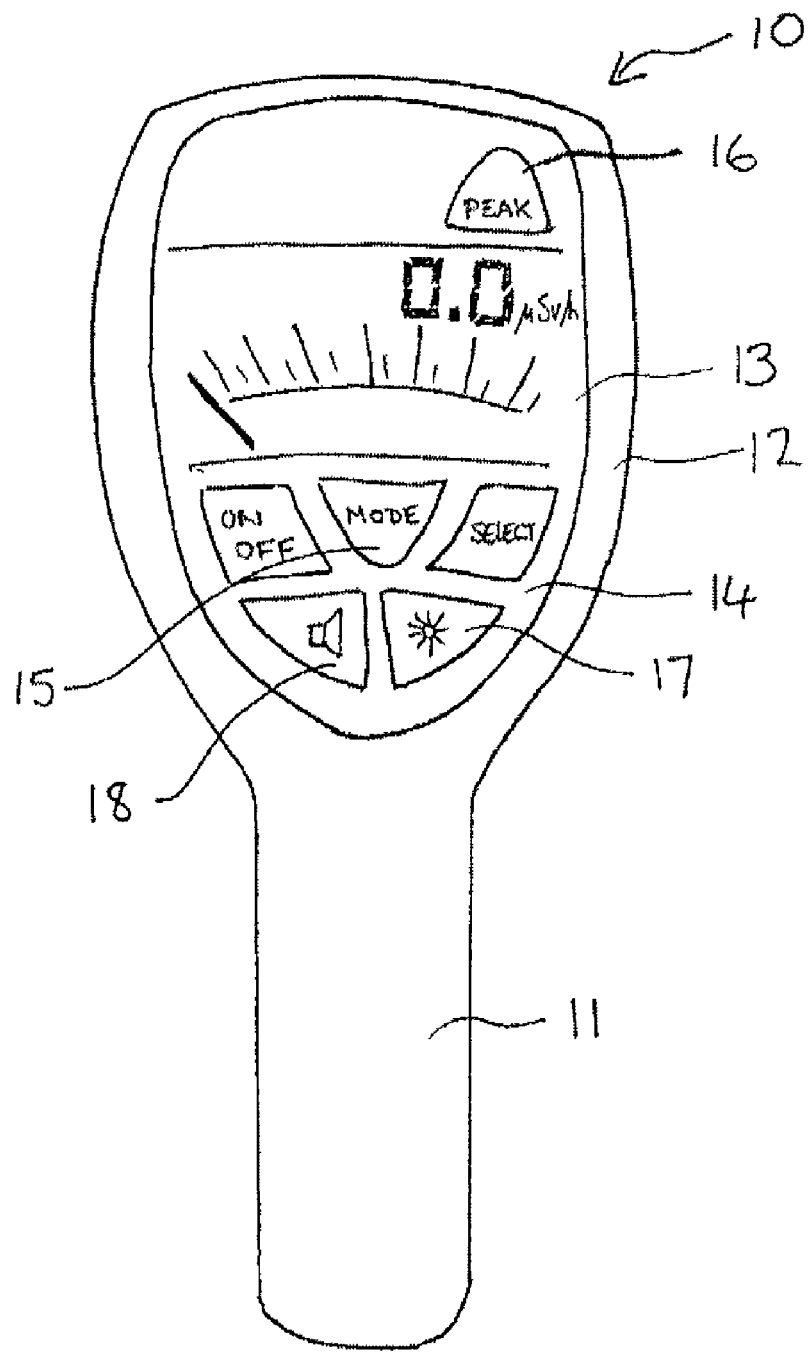
FIG. 1: A plan view of a dose-rate meter according to the invention.

The radiation detector may be enclosed within the sealed housing. Alternatively, when the instrument comprises a contamination monitor, the radiation detector may be housed within a separate detector housing having a window through which radiation may pass to the detector. The window should be sufficiently thin to allow low-energy alpha particles to penetrate the window, i.e. it should be a low-attenuation window. The window is protected by a fine metal gauze or grid in a known manner. The detector, when housed in a separate detector housing, is preferably connected to the power supply and processor within the instrument housing by means of a cable, which is preferably extendible, e.g. coiled. When a cable is present it may be permanently connected to the instrument housing and the detector housing. Alternatively the cable, when present, may be detachably connected to either one or both of the instrument and detector housing by means of a removable connector and receiver system, such as a jack plug or similar connector and socket, which is adapted to connect the cable to the instrument and/or detector housing. This arrangement is convenient to facilitate the replacement of a detector in the case of damage or malfunction without breaching the instrument housing. The connector and receiver system is selected to conform to a similar safety standard of intrinsic safety with respect to working in hazardous areas as the rest of instrument. Alternatively the detector housing and instrument housing may comprise wireless transmission and receiving means in order that the signals generated by the detector may be received and processed by the processor. In this case the detector housing may contain a power supply for the detector and transmission means. The detector housing is preferably mountable on and demountable from the instrument housing. The attachment means for demountably attaching the detector housing to the instrument housing may comprise a hook, clip or similar means. In a preferred embodiment the detector housing or the instrument housing comprises a rod portion and the other housing comprises a corresponding aperture or socket into which said rod portion can be engaged thereby to mount the detector housing on the instrument housing.

The detector housing preferably incorporates means by which the angle of the detector window may be adjusted with respect to the instrument housing or the attachment means. In a preferred embodiment the detector housing is fixed to the attachment means by a pivot.

The instrument housing and/or the detector housing may be adapted to be mounted upon an extension rod or handle to enable the detector to be used beyond arms length, i.e. as a probe. It is preferred when the detector is housed in a separate detector housing that the detector housing is adapted to be mounted upon an extension rod. This may be achieved for example by providing engagement means such as a threaded portion which is adapted to engage corresponding means provided on an extension rod. In a preferred embodiment the detector housing comprises a rod or extension piece for mounting the detector housing on the instrument housing and the rod comprises threaded portion which is adapted to engage a corresponding threaded portion of an extension rod. The detector housing may alternatively be mountable on a tripod or monopod and may incorporate a standard engagement portion for such purposes. The extension rod may comprise a handle or grip. In this way the instrument housing, which incorporates the display, may be held in one hand whilst the detector housing, mounted on an extension rod may be held away from the user to monitor areas which are beyond arms length, e.g. on the floor or above the user. The extension rod may be extendable, e.g. telescopic or provided in sections, and may be extendable to over 10 m to allow for contamination monitoring in pipes for example.

The instrument display may comprise an analogue display such as a moving needle and scale to provide an instantaneous indication of the radiation dose rate detected by the detector. Alternatively or additionally, the display may provide a digital output in the form of an alphanumeric display. Preferably the display comprises both analogue scale and an alphanumeric display. The instrument may comprise more than one digital or more than one analogue display. The display is visible through a transparent or translucent portion of the instrument housing, i.e. a screen. The transparent/translucent material forming the housing is resistant to sparking and electrostatic discharge. The screen material may be coated with an antistatic material and/or formed from a material which is inherently antistatic. When the instrument is a dose-rate meter, it is preferably calibrated to display a direct reading of dose rate, e.g. in μSv per hour. Normally the dose rate meter is calibrated using $^{137}$Cs.

The dose rate monitor instrument is preferably adapted to provide a cumulative measurement of radiation dose, e.g. in μSv over a period of time in addition to an instantaneous measurement of the dose rate detected. In this way the instrument is suitable for monitoring the dosage of radiation received in a particular location or by a person wearing or carrying the instrument. For example, when the instrument has a digital display and an analogue display, the instrument may be programmed to show the instant dose rate using the analogue display, whilst the cumulative dose over a period of time is displayed on the digital display. Preferably the instrument is capable of displaying the peak dose rate measured during the period of monitoring. The instrument may be provided with means to indicate when a pre-determined dose or dose rate has been exceeded, e.g. by means of a visual or audible signal.

The instrument comprises a pulse counter, amplifier and a signal processor, normally comprising pulse shaping and smoothing algorithms, for converting the signals generated by the detector into a visual and/or audible display. The processor comprises a memory which is capable of holding the calibration and display codes. Preferably the instrument also comprises a memory in which the amount of radiation detected may be stored for access by the user or, for example, to enable the maximum dose and cumulative dose functions to be used. The processor is preferably programmed to enable selection of an appropriate calibration and to enable the user to select the display mode required. The instrument may be programmed to display in one or more than one unit, for example Rems (or m Rems) and Sv or μSv and optionally may convert between different units.

When the instrument is a contamination monitor, it is capable of displaying the events experienced by the detector and of displaying the radioactivity monitored in counts per second. Preferable the contamination monitor is calibrated to display the radiation measured in Bqcm$^{-2}$ or another suitable unit, for more than one common nuclide and the appropriate calibration may be selected by the user. The calibration is required when the Geiger Muller tube used is not energy-compensated because the Geiger Muller tube efficiency varies according to the nuclide being detected. The instrument preferably includes a calibration for at least one of, more preferably at least three of, most preferably all of the nuclides in the group consisting of $^{241}$Am, $^{14}$C, $^{210}$Pb (dry), $^{210}$Pb (wet), $^{226}$Ra (dry), $^{226}$Ra (wet), $^{90}$Sr and $^{36}$Cl. The distinction between dry and wet calibrations for some nuclides may be particularly useful when radioactive surfaces must be monitored in wet conditions, e.g. on a drilling platform, because low energy radiation such as low-energy alpha-particles or beta-particles may be considerably attenuated by water.

The instrument software is preferably programmed to convert between the calibration scales if more than one calibration mode is provided. Calibration of such instruments should be checked and re-adjusted if necessary periodically throughout the lifetime of the instrument, at intervals of about 12 months. It is preferred to incorporate in the instrument a memory function to hold the date of calibration and/or the date when the calibration should next be performed. The date may be re-set on calibration. Preferably the instrument is programmed to display the calibration (due) date, most preferably each time the instrument is switched on. The instrument may incorporate a visual display or audible signal when the calibration date is within or without a pre-determined time from the present date so that the user is warned when calibration is due or overdue. The display may be provided with a light to illuminate the display.

The instrument housing comprises a user interface enabling the user to switch the power on or off, and select the display mode. The interface preferably provides one or more pressure activated buttons or switches located on one or more interface panels, the switches preferably being sealed within the housing. When more than one calibration is available, the interface comprises means to select the desired calibration. When more than one mode, e.g. continuous cumulative monitoring or instantaneous monitoring is provided, the interface provides means for the user to select the desired mode. Optionally separate buttons are provided to select the calibration, mode, peak dose etc. The interface may also provide means for the user to operate an audible indication means and/or a light.

The instrument preferably comprises carrying means such as a handle, wrist or neck strap, or a case which includes such carrying means. It is preferred that a case, strap etc is detachable from the instrument so that contamination hazards may be minimised.

The power supply preferably comprises a battery, housed within a sealed compartment within the instrument housing. The battery may be a rechargeable battery. The instrument preferably includes means to signal when the battery power falls below a threshold in order to warn the user. The instrument may comprise means to indicate the estimated power remaining in the battery.

The instrument is preferably suitable for use in hazardous areas, zones 0, 1 and 2. The instrument therefore preferably incorporates intrinsically safe materials and design. The power, processor and display circuits are preferably not sparkable. The power supply is preferably potted. The housing is preferably sealed to prevent the ingress of gas or liquid. The instrument is preferably resistant to normal impact shocks such as may be experienced when the instrument is dropped so the housing is preferably rugged and formed from a tough, e.g. impact-modified, material. Preferably the housing is formed completely or mostly from a non-metallic material which is resistant to static discharge or is coated with such a material. If metal parts are used, they should be formed from a metal or alloy which is acceptable for use in hazardous zones. The instrument according to the invention is capable of meeting the relevant standards for electrical apparatus for use in explosive gas atmospheres, including IEC 60079-0: 2004, IEC 60079-11:1999, EN 60079-0:2004, EN 50020: 2002 and EN 60079-26: 2004. Additionally, the instrument must meet other relevant standards required for its sale and use in industrial installations, such as standards relating to radiofrequency emission and electromagnetic interference (e.g. EN6100).

FIG. 1 shows a dose-rate meter according to the invention 10, comprising a handle portion 11 integrated with a body portion 12, both being portions of the sealed housing. The housing is formed from a rugged nylon material. The body portion comprises a user interface comprising a display area 13 and an operating area 14 in which the operating buttons for the instrument are located. The instrument is of generally streamlined design to enable it to be easily carried in a pocket or holster. The instrument is approximately 250 mm in length and weighs approximately 500 g. The housing contains the detector, signal processor, display and power supply. The detector is a single halogen energy compensated Geiger Muller tube capable of detecting X-rays and gamma range of energies in the range 45 keV to 1.4 MeV. In use, the monitor is carried by the user or is located in an area where the radiation levels are to be monitored. When switched on, the instrument shows the instantaneous dose rate, between 0 and 1000 µSv per hour, measured by the detector on the analogue display. In this embodiment, the digital display may show from 0 to 10,000 µSv per hour. The user may select the function of the digital display using the "mode button" 15 so that the cumulative dose since the monitoring was begun may be shown. Operation of the "peak" button 16 causes the peak dose rate over the monitoring period to be displayed so that the maximum exposure rate may be recorded. Operation of the "light" button 17 switches on a backlight to illuminate the display. The instrument may emit an audible signal indicative of the dose rate on operation of the "sound" button 18.

Figure 2:
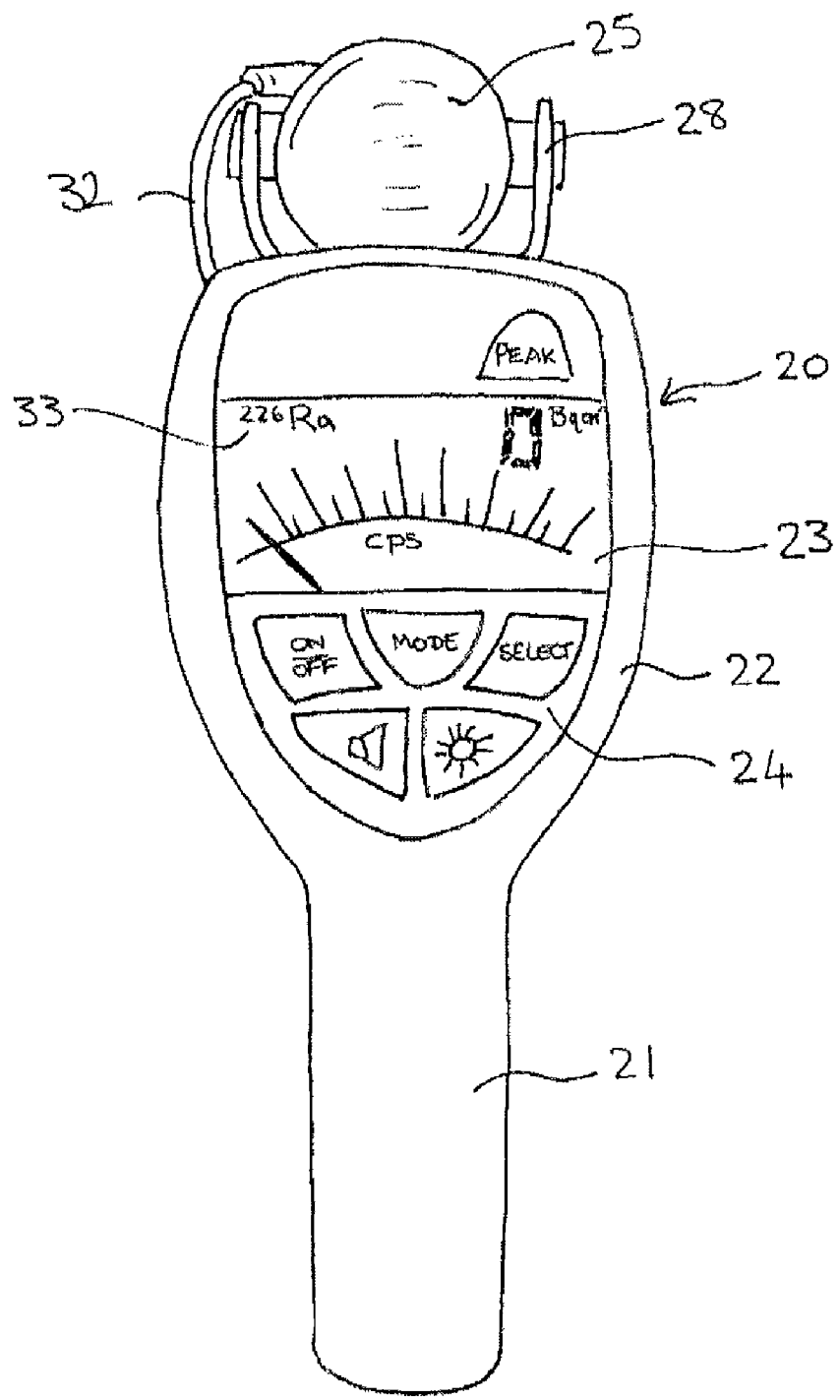
FIG. 2: A plan view of a contamination monitor according to the invention.
Figure 3:
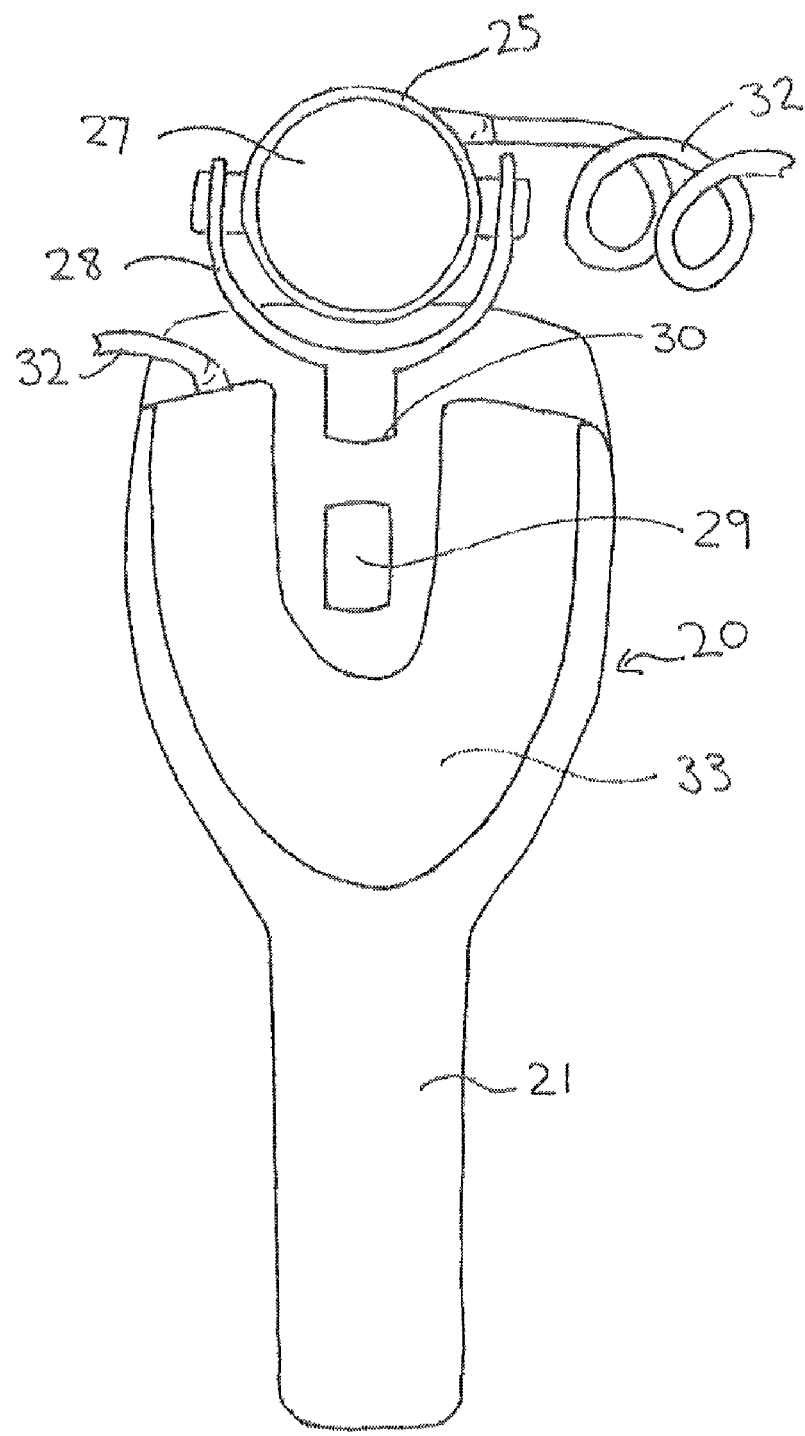
FIG. 3: A plan view from the rear of a contamination monitor according to the invention.
Figure 4:
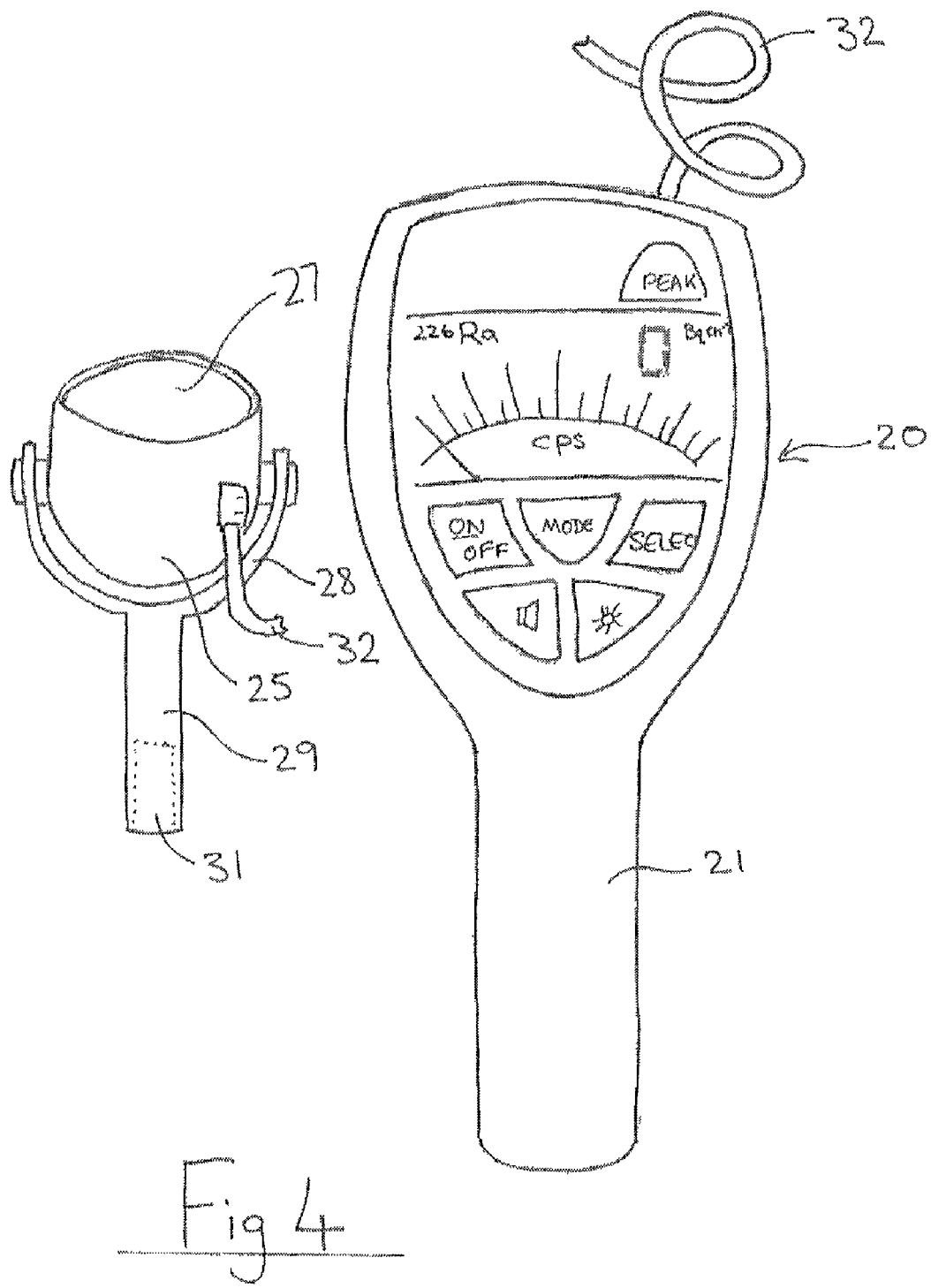
FIG. 4: A plan view from the rear of a contamination monitor according to the invention showing the detector detached from the instrument housing.

FIGS. 2-4 show a contamination monitor according to the invention 20 comprising a handle portion 21 integrated with a body portion 22, both being portions of the sealed housing. The housing is formed from a rugged nylon material. The body portion comprises a user interface comprising a display area 23 and an operating area 24 in which the operating buttons for the instrument are located. The housing contains the signal processor, and display. The detector is located in a detector housing 25 formed from similar rugged nylon material and having a window portion 27 through which radiation, particularly alpha and beta particles may enter the detector. The detector is a single halogen Geiger Müller tube shaped to have a relatively high surface area, having a 50mm diameter. The detector housing is pivotably mounted upon a bracket 28 which comprises an extended rod portion 29 adapted to fit into a receiving socket 30 located in the instrument housing. The rod portion includes a threaded socket 31 into which an extension rod may be fitted so that the detector may be operated at a distance from the user. The detector is connected to the instrument housing by a coiled cable 32 (only partially drawn, for clarity) to pass power to the detector and signals from the detector to the signal processor. When the detector housing is mounted on the instrument housing, the coiled cable may be stored in a recessed compartment 33 at the rear of the instrument (shown in FIG. 3). The instrument is powered by alkaline batteries.

In use, the detector of the contamination monitor is held at a distance of approximately 3-5 mm from the surface to be inspected for contamination and moved in a scanning motion along the surface. The detector may be mounted on an extension rod or pole to allow convenient monitoring at floor level for example, or it may be inserted into a pipe for monitoring contamination within the pipe.

When the instrument is switched on, the digital display shows the date when the instrument should be tested and/or recalibrated, which is pre-set by the testing organisation or manufacturer. The analogue display shows the amount of power remaining in the batteries. The instrument is calibrated for eight different contaminants, $^{241}$Am, $^{14}$C, $^{210}$Pb (dry), $^{210}$Pb (wet), $^{226}$Ra (dry), $^{226}$Ra (wet), $^{90}$Sr and $^{36}$Cl. The user may select the calibration according to the radioactive isotope to be monitored for by depressing the "mode" button to sequentially show a calibrated isotope in a portion of the display 23 and selecting the appropriate isotope when it appears. The instrument shows the activity monitored by the detector as counts per second on the analogue needle display, whilst the digital display may be selected to show the radioactivity in Bqcm$^{-2}$ calculated for the selected isotope using the internal calibration. The "peak", "light" and "sound" buttons function in a similar way to that described above.

The contamination monitor of the invention is useful for the detection and monitoring of natural and manufactured radioactive contamination in a variety of operations in the nuclear industry, medicine, research, minerals processing, and oil and gas exploration. The radiation monitor is useful for routine monitoring of radiation exposure in a variety of industries where exposure is likely to arise.

The invention claimed is:

1. An electronic instrument for the measurement of radiation comprising:
    a radiation detector comprising a Geiger Müller tube which is adapted for the detection of low energy β- or α-particles,
    a power source,
    a signal processor and a display,
    wherein said power source, said signal processor and said display are housed within a sealed instrument housing formed from a non-metallic material which is resistant to static discharge and wherein the power, processor and display circuits are not sparkable, such that the instrument is intrinsically safe, and further wherein the instrument is a radioactive contamination monitor.

2. The instrument according to claim 1, wherein said instrument housing comprises an integral handle portion.

3. The instrument according to claim 1, wherein said Geiger Müller tube is energy-compensated and is suitable for the detection of gamma and X-radiation having energies in the range from 40 keV to 1.4 MeV.

4. The instrument according to claim 1 further comprising a separate detector housing and wherein the radiation detector is housed within said separate detector housing, said separate detector housing having a window through which radiation may pass to the detector and having communication means by which signals generated by the detector may be transmitted to said signal processor within the instrument housing.

5. The instrument according to claim 4, wherein said communication means comprises a cable.

6. The instrument according to claim 4, wherein said communication means comprises wireless transmission and receiving means.

7. The instrument according to claim 4, wherein the detector housing is mountable on and demountable from the instrument housing.

8. The instrument according to claim 1, wherein said display comprises at least one analogue display and at least one alphanumeric digital display.

9. The instrument according to claim 1, wherein the instrument is calibrated to display the radiation density for more than one common nuclide.

10. The instrument according to claim 9, calibrated to calculate radiation for at least two isotopes selected from the group consisting of $^{241}$Am, $^{14}$C, $^{210}$Pb (dry), $^{210}$Pb (wet), $^{226}$Ra (dry), $^{226}$Ra (wet), $^{90}$Sr and $^{36}$Cl.

11. The instrument according to claim 9 further comprising a non-transitory computer readable medium including a computer program configured to convert between a calibration for a first one of said common nuclides and a calibration for a second one of said common nuclides.

12. The instrument according to claim 9 further comprising a memory function which stores a date of calibration.

13. The instrument according to claim 9, comprising means for selecting the desired calibration.

14. The instrument according to claim 1, wherein the housing is sealed to prevent the ingress of gas or liquid.

* * * * *